United States Patent
Kubanoff

[15] 3,665,463
[45] May 23, 1972

[54] FIXED TARGET DETECTOR FOR USE WITH DOPPLER RADAR

[72] Inventor: Jacob H. Kubanoff, Philadelphia, Pa.
[73] Assignee: The United States of America as represented by the Secretary of the Army
[22] Filed: Sept. 14, 1970
[21] Appl. No.: 71,817

[52] U.S. Cl. .................................................343/5 R, 343/7.7
[51] Int. Cl. ...........................................................G01s 9/42
[58] Field of Search ..................................................343/5, 7.7

[56] References Cited

UNITED STATES PATENTS 3,275,975  9/1966  King .............................340/1 R
3,618,087  11/1971  Smith et al. ....................343/7.7

Primary Examiner—Malcolm F. Hubler
Attorney—Harry M. Saragovitz, Edward J. Kelly, Herbert Berl and Sheldon Kanars

[57] ABSTRACT

A return radar signal processing system which may be connected to existing doppler radar for detecting a stationary target or normally moving target which has stopped. The return radar signal is sampled in the clutter portion and moving target (or doppler) portion thereof, the noise energy in the clutter portion being compared with the noise scintillation products energy in the doppler portion. An unbalance or change in the ratio of these two energy levels is detected as a fixed target.

16 Claims, 2 Drawing Figures

INVENTOR,
JACOB H. KUBANOFF

FIXED TARGET DETECTOR FOR USE WITH DOPPLER RADAR

The invention described herein may be manufactured, used, and licensed by or for the Government for governmental purposes without the payment to me of any royalty thereon.

BACKGROUND OF THE INVENTION

This invention relates to a radar system for detecting a fixed or non-moving target. More particularly, this invention relates to a radar system which operates in conjunction with existing doppler radars to detect fixed targets.

Heretofore, all doppler radar systems depended for their operation upon the relative motion of the target with respect to the radar receiver. This limitation in doppler radar design was purposely provided since it was reasoned, that only a target would be locomotive. In other words, doppler radar system designers solved the problem of attempting to detect a target in the presence of low frequency background clutter and noise (due to trees, buildings, rocks, water, etc.) by rejecting this fixed ground return entirely and instead, looking for target movement.

To be sure, such radar easily detected a moving tank, for example, even when that tank was surrounded by rocks, trees, and/or other, stationary, terrain features. It is not long, however, before the unfriendly tank operator realizes the principle upon which doppler radar was based. When this occurs the tank operator merely stops the tank and, consequently, the doppler radar fails to display the target.

Radar systems which detect fixed targets exclusive of ground return do exist. However, these systems cannot detect moving targets and are therefore of limited utility.

While it would be possible to utilize or "marry together" existing doppler and fixed target radar systems so as to be able to detect both moving and fixed targets, cost and size render such an approach unfeasible. Moreover, there would occur much duplication of parts and equipment.

There has therefore arisen a need for a radar system which can be utilized with existing doppler radar systems and which can detect a fixed or non-moving target.

It is the general purpose of the present invention to provide a radar system which accepts the return signal of a doppler radar system and which detects the presence of a fixed or non-moving target therein.

SUMMARY OF THE INVENTION

The present invention is adapted to be rendered operative when a doppler radar screen (which had been revealing a moving target) goes blank. Included in the invention are a pair of narrow band filters placed one each in the ground clutter and doppler or moving target region of a return radar signal. These filters receive the radar return signal through a logarithmic amplifier and provide their outputs to respective signal synthesizers, each of which produces a dc voltage proportional to the input signal received. One of the two dc voltages is inverted while the other is attenuated by a balancing network so that the two signals are made in equal amplitude. These two resulting signals are added together, the resultant summed signal being equal to zero. However, upon the occurrence of a fixed target, the resultant summed signal becomes positive in polarity and is then detected by a polarity sensor such as a diode.

It is postulated that the ratio of the energy in the clutter region to the energy in the doppler region is constant for any terrain. However, the presence of a high reflectivity fixed target, such as a tank which has stopped moving, decreases the clutter noise and the noise in the doppler region while simultaneously increasing the overall clutter or low frequency energy response. The result is an unbalance in the aforementioned ratio. This unbalance is sensed, further enhanced, and detected by the present invention.

DESCRIPTION OF THE PREFERRED EMBODIMENT

Figure 1:
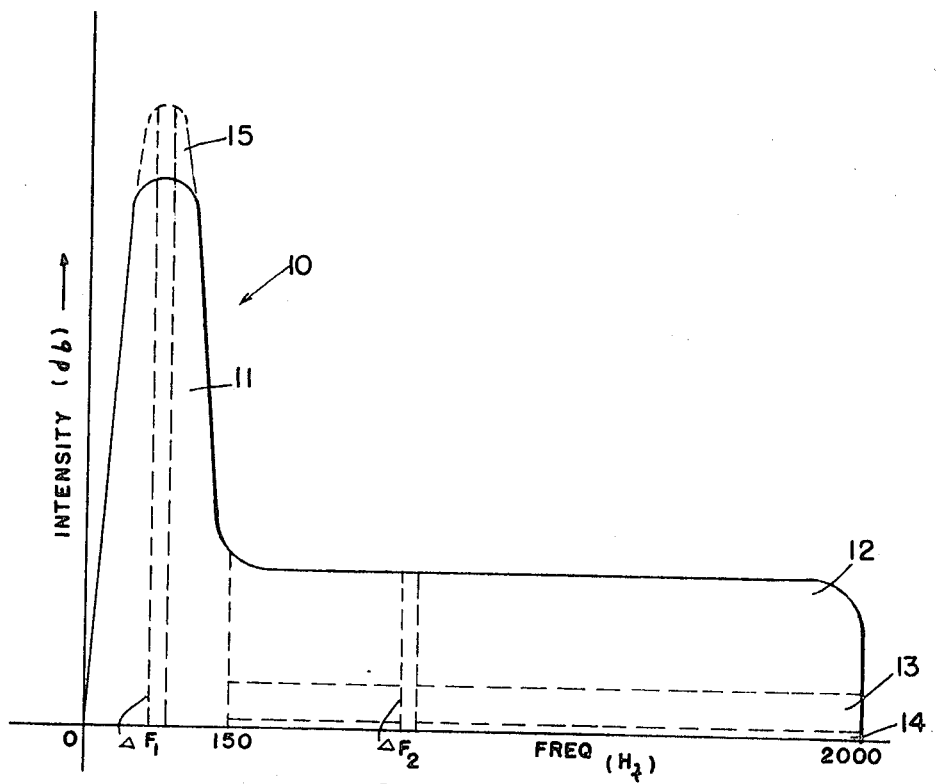
FIG. 1 is a graphical representation of a typical doppler radar return signal.

Referring now to FIG. 1, there is shown a representative return radar signal 10 containing both ground clutter 11 in the very low frequency portion thereof, as for example from 0 Hz to 150 Hz, and doppler response 12 plus receiver noise 13, as for example from 150 Hz to 2,000 Hz. For reasons that will become apparent hereinafter, it is important to note that a certain proportion of the receiver noise 14 in the 150 Hz to 2,000 Hz frequency band contains scintillation products 13 of the ground clutter noise 11. That is, there is some clutter in the receiver or spectral noise 14. This clutter may be, for example, the cross products or harmonics of the clutter produced by the motion of fluttering leaves and other vegetative sources on the ground. The precise reason as to why this scintillation noise 13 occurs in the receiver noise 14 is not here pertinent, it being only important to know that such noise exists. For convenience, the noise scintillation products 13 are shown as a discrete level in the spectral noise 14. It should be understood however that the products 13 are more or less randomly distributed within the spectral noise 14 and are not as well defined as is shown in FIG. 1.

It has been found that an increase or decrease in the noise energy of ground clutter 11 yields a corresponding increase or decrease in the noise energy of the scintillation products 13. In other words, the ratio of the noise energy 11 to the noise energy 13 is a constant. Thus when radar reflects from a water surface (as opposed to a foliated surface), the ground clutter 11 amplitude will decrease but so will the noise scintillation products 14 so that the constant ratio is maintained. However, the presence of a fixed target increases the clutter amplitude by significant amount due to the target's reflectivity, as shown in 15. At the same time, however, the clutter noise and therefore the scintillation products 13 decrease. Since the overall clutter response 11 and 15 increases while the scintillation products 13 decreases, an unbalance in the aforementioned ratio occurs. The present invention contemplates utilizing that unbalance to detect a fixed target.

Figure 2:
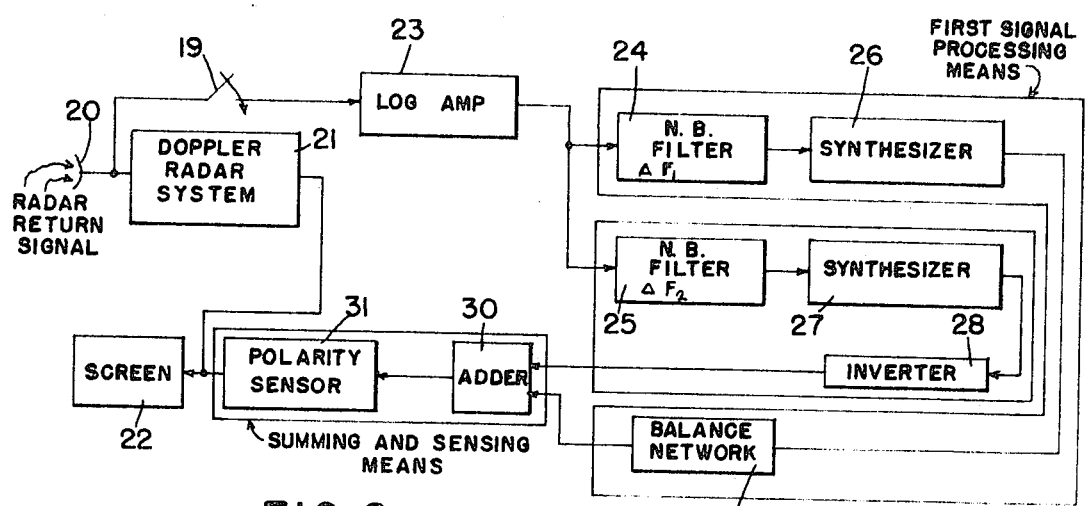
FIG. 2 is a block diagram of the invention showing a possible connection thereof with an existing doppler radar system.

As noted hereinabove, if a tank, for example, or any other highly reflective object comes into an area being illuminated by doppler radar and stops, the reflectivity of the area rises considerably since metal reflects radar signals approximately 10 times better than the ground. Moreover, the clutter noise 11 decreases since the tank shields that vegation under it which heretofore produced a portion of the ground clutter. Since the ground clutter was decreased, so were the scintallation products 13. It is to be observed, however, that a stationary tank will have a very low (theoretically zero) frequency associated therewith so that the overall ground clutter 11 portion of the curve will be increased thereby by the curve (portion 15) of FIG. 1. This increase in amplitude of the clutter portion (due to the tank reflectivity) in conjunction with a corresponding decrease in noise scintillation products 13 (due to covering of some of the ground by the tank) results in an unbalance in the aforementioned ratio. Detection of this unbalance will thus indicate the tank's presence. Referring now to FIG. 2, there is shown the circuitry in accordance with the invention by which this unbalance is detected.

FIG. 2 includes a radar antenna 20 which transmits both a radar signal and receives a return. The antenna 20 is connected to a doppler radar system 21 which, in turn, is connected to a viewing screen 22 thereof. This system is representative of presently utilized doppler radar systems and as such forms no part of the present invention.

The electrical output of antenna 20 is also connected to a logarithmic amplifier 23 through a make and break switch 19. The logarithmic amplifier 23 functions to further enhance the aforementioned ratio unbalance since the smallest signal received thereby is the most severely attenuated. That is—amplifier 23 takes the logarithm of the signal supplied to it. Thus, for example, for a signal of input magnitude 100 the output might be 2, whereas a signal input magnitude of 10 might yield an output of 1. If both of these signals are supplied to logarithmic amplifier 23, the input level would be 110 and the output would be 2.04. The smaller signal amplitude 10 has been compressed so that what was initially a 10:1 or 1: 1/10 ratio has evolved as a ratio of 1: 1/50. By analogy, the signal of magnitude 100 may be the clutter signal whereas the signal magnitude 10 may be the noise scintillation products signal. The presence of a stationary tank in and of itself unbalances the scintillation products to clutter noise ratio as discussed heretofore. This unbalance is now seen to be further pronounced by amplifier 23 due to the greater compression of the scintillation products signal.

An amplifier 23 is connected to two narrow band (N.B.) filters 24 and 25 respectively. While both filters have substantially the same band width, filter 24 has a center frequency positioned in the ground clutter region (at 60 Hz, for example) and filter 25 has a center frequency positioned in the moving target region ( at 750 Hz, for example). For convenience, the center frequency of filter 24 may be denominated as $f_1$ and the center frequency of filter 25 may be denominated as $f_2$. Filter 24 then passes the band $\Delta f_1$ (which may be 6 cycles wide) while filter 25 passes the band $\Delta f_2$ (which may be 20 cycles wide).

The outputs of filters 24 and 25 are respectively connected to like signal synthesizers 26 and 27 which may each comprise an emitter coupled monostable multivibrator biased by the respective filter outputs and also modulated thereby at their respective output collectors so that the multivibrator's pulse width and amplitude are a function of input signal amplitude.

The output of synthesizer 27 is connected to an inverter 28, while the output of synthesizer 26 is connected to a resistive balancing network 29. Inverter 28 and balancing network 29 are connected at their respective outputs to an adder 30. The adder 30 is connected to a polarity sensor 31 which may be a forward biased diode so that only positive signals are passed thereby. Polarity sensor device 31 is connected at its output to the viewing screen 22.

Filters 24 and 25 may comprise any of the narrow band, steep roll-off filters presently existing. However, the steeper the roll off, the more desirable for this application. A filter particularly suitable for use herein is the subject matter of copending U.S. Pat. application Ser. No. 872,970, entitled "-Divergent Filter System," filed Oct. 31, 1969, by the same inventor and assigned to the same assignee. In like manner, synthesizers 26 and 27 may comprise any of the sinusoid to DC converters which provide a direct current output voltage or level which is proportional to the maximum amplitude of the input sinusoidal signal received. A synthesizer particularly suitable for use herein is also disclosed in the aforementioned U.S. Patent application. The synthesizer so disclosed has a plurality of possible outputs, output A being the most suitable for this application.

The operation of the system is as follows. It will be assumed that the radar return signal has been reflected from a moving tank and has been processed through the doppler system 21 to be viewed by an operator watching the screen 22. Suddenly the tank stops moving and the screen 22 becomes blank. Upon noticing this, the operator closes the switch 19 (which may, if desired, be "ganged" to a switch not shown which opens to disengage radar system 21) to provide the return radar signal to logarithmic amplifier 23.

Amplifier 23 provides to the filters 24 and 25 the logarithm of the return signal. Filter 24 passes only that small portion in the clutter region 11 that is within its pass band. Similarly, filter 25 passes only that small portion in the doppler region 12 that is within its pass band. The two signals thus passed are respectively converted by synthesizers 26 and 27 to two DC levels, each of which is proportional to the maximum amplitude of the signal passed by the respective filter. Inverter 28 inverts the polarity of the DC signal from synthesizer 27. Balance network 29, which may include a manually operated potentiometer is preset so as to attenuate the DC signal from synthesizer 26 so that it is equal in magnitude to (but now also opposite in polarity from) the signal emerging from inverter 28 in the absence of a fixed target. This can be achieved because the ratio of the energy passed by each filter is constant, as discussed heretofore. Thus when no fixed target is present adder 30, which sums the inverted signal and balanced signal, provides a zero output. A change in terrain produces a corresponding increase or decrease in spectral noise. The result is therefore still a zero output from adder 30. An increase in only the spectral noise causes adder 30 to produce a negative output. However, this condition must have been initiated in other than the clutter region so that a fixed target could not have been the cause. An increase in only the clutter region can only be caused by a fixed target. This cause adder 30 to provide a positive signal. To insure that only positive signals are detected, adder 30 is connected to polarity sensor 31 which provides an output to screen 22 only when the signal reserved thereby is positive in sense.

It is thus seen that so long as there is no fixed target present, the adder 30 provides either a zero or a negative output voltage. Neither of these voltages are passed by polarity sensor 31. A stationary target, however, increases the clutter response, and hence causes adder 30 to provide a positive output. This is sensed at 31 as a target.

In summary, it should be noted that the present invention comprises, broadly, an amplifier (herein disclosed to be logarithmic but which may be linear) connected to first and second signal processors (comprising, respectively, filter 24, synthesizer 26, balance network 29 and filter 25, synthesizer 27, inverter 28) which are in turn connected to summing and polarity sensing means.

It is further noted that in lieu of balance network 29, there may be inserted an amplifier in the line between inverter 28 and adder 30, it being only necessary that the two signals emerging from the two processors be equal in magnitude and opposite in polarity. Similarly, inverter 28 may be placed in the line with synthesizer 26, in which case, the polarity of sensor 31 should be reversed.

I wish it to be understood that I do not desire to be limited to the exact details of construction, shown and described, for obvious modifications will occur to a person skilled in the art.

I claim:

1. A radar system for detecting a non-moving target exclusive of ground return comprising:
   means for transmitting a radar signal to a target and for receiving a return signal response therefrom;
   first signal processing means operatively connected to said transmitting and receiving means for passing a first portion of said return signal and for modifying the amplitude of the portion passed;
   second signal processing means operatively connected to said transmitting and receiving means for passing a second portion of said return signal and for changing the polarity of the portion passed; and
   summing and sensing means connected to said first and said second signal processing means and for providing a signal indicating the detection of a non-moving target upon the exhibition of a preselected polarity by said summed signal.

2. A radar system as described in claim 1, further including:
   an amplifier interposedly connected between said transmitting and receiving means and said first and said second processing means for amplifying the return signal.

3. A radar system as described in claim 2, wherein:
   said amplifier is of the logarithmic type.

4. A radar system as described in claim 2, wherein said first signal processing means comprises:
   a filter for passing a selected portion of the return signal;
   means connected to said filter for providing an output signal level proportional to the maximum amplitude of the signal portion passed by said filter; and means connected to receive said output signal level for changing the level thereof.

5. A radar system as described in claim 4, wherein:

said filter is of the narrow band type and has a center frequency positioned in the low frequency portion of the return signal response.

6. A radar system as described in claim 2, wherein said second signal processing means comprises:
a filter for passing a selected portion of the return signal;
means connected to said filter for providing an output signal level proportional to the maximum amplitude of the signal portion passed by said filter; and
means connected to receive said output signal level for changing the polarity thereof.

7. A radar system as described in claim 6, wherein:
said filter is of the narrow band type and has a center frequency positioned in the relatively higher frequency portion of the return signal response for detecting a spectral shift in radar return.

8. A radar system as described in claim 2, wherein said summing and sensing means comprises:
an adder connected to said first and said second signal processing means for summing the signals passed thereby; and
polarity sensing means connected to said adder for providing a signal indicating the presence of a non-moving target when the resultant signal summed by said adder is of a specific polarity.

9. A radar system as described in claim 2, wherein:
said first signal processing means includes a first filter for passing a first selected portion of the return signal; means connected to said first filter for providing a first output signal level proportional to the maximum amplitude of the signal portion passed by said first filter; and means connected to receive said first output signal level for changing the level thereof; and
further wherein said second signal processing means includes a second filter for passing a second selected portion of the return signal, means connected to said second filter for providing a second output signal level proportional to the maximum amplitude of the signal portion passed by said second filter, and means connected to receive said second output signal level for changing the polarity thereof.

10. A radar system as described in claim 9, wherein said summing and sensing means comprises:
an adder connected to said first and said second signal processing means for summing the signals passed thereby; and
polarity sensing means connected to said adder for providing a signal indicating the presence of a non-moving target when the resultant signal summed by said adder is positive in polarity.

11. A radar system for use in conjunction with a doppler radar for detecting a non-moving target, comprising:
means for transmitting a radar signal to a target and for receiving a return signal response therefrom;
a switch connected to said means for transmitting and receiving for permitting the passage of said return signal upon switch closure;
an amplifier connected to said switch for amplifying the return signal passed by said switch;
first signal processing means connected to said amplifier for passing a first portion of the amplified return signal and for modifying the amplitude of the portion so passed;
second signal processing means connected to said amplifier for passing a second portion of the amplified return signal and for changing the polarity of the portion so passed; and
second signal processing means connected to said amplifier for passing a second portion of the amplified return signal and for changing the polarity of the portion so passed; and
means connected to said first and said second signal processing means for summing the signals passed thereby and for providing a signal indicative of a non-moving target when the signals so summed are positive in sense.

12. A radar system as described in claim 11, wherein said first signal processing means comprises:
a filter for passing a selected portion of the return signal;
means connected to said filter for providing an output signal level proportional to the maximum amplitude of the signal portion passed by said filter; and
means connected to receive said output signal level for changing the level thereof.

13. A radar system as described in claim 11, wherein:
said filter is of the narrow band type and has a center frequency positioned in the low frequency portion of the return signal response.

14. A radar system as described in claim 11, wherein said second signal processing means comprises:
a filter for passing a selected portion of the return signal;
means connected to said filter for providing an output signal level proportional to the maximum amplitude of the signal portion passed by said filter; and
means connected to receive said output signal level for changing the polarity thereof.

15. A radar system as described in claim 14, wherein:
said filter is of the narrow band type and has a center frequency positioned in the relatively higher frequency portion of the return signal response.

16. A radar system as described in claim 11, wherein said means connected to said first and said second signal processing means includes:
an adder connected to said first and said second signal processing means for summing signals passed thereby; and
polarity sensing means connected to said adder for providing a signal indicating the presence of a non-moving target when the resultant signal summed by said adder is of a specific polarity.

* * * * *